United States Patent [19]

Tang

[11] Patent Number: 5,214,589
[45] Date of Patent: May 25, 1993

[54] THROAT HEIGHT CONTROL DURING LAPPING OF MAGNETIC HEADS

[75] Inventor: George H. Tang, San Jose, Calif.

[73] Assignee: Read-Rite Corp., Milpitas, Calif.

[21] Appl. No.: 675,096

[22] Filed: Mar. 22, 1991

[51] Int. Cl.$^5$ .................. G06F 15/46; B24B 49/00
[52] U.S. Cl. .................. 364/468; 51/165 R
[58] Field of Search ......... 364/468; 51/165 R, 109 R, 51/281 R, 165.77, 217 H; 29/592.1

[56] References Cited

U.S. PATENT DOCUMENTS

| | | | |
|---|---|---|---|
| 4,511,942 | 4/1985 | Valstyn | 51/281 R |
| 4,536,992 | 8/1985 | Hennenfent et al. | 51/109 R |
| 4,675,986 | 6/1987 | Yen | 29/592.1 |
| 4,841,625 | 6/1989 | Valstyn | 51/165 R |
| 4,861,398 | 8/1989 | Fukuoka et al. | 51/165 R |
| 4,912,883 | 4/1990 | Chang et al. | 51/165 R |
| 4,914,868 | 4/1990 | Church et al. | 51/165.77 |
| 5,065,483 | 11/1991 | Zammit | 51/165 R |

Primary Examiner—Jerry Smith
Assistant Examiner—Jim Trammell
Attorney, Agent, or Firm—Nathan N. Kallman

[57] ABSTRACT

During a lapping operation to obtain an optimum throat height for a thin film magnetic head, an M-H looper circuit is coupled directly to the head coil for measuring the magnetization and saturation current of the head in response to a given drive current. An amplitude modulated analog output signal is digitized and the resultant digital number is compared to stored data signals which are representative of optimum throat heights for the design of the head being lapped. The lapping operation is controlled in response to the difference signals obtained by the comparison.

6 Claims, 4 Drawing Sheets

THROAT HEIGHT CONTROL DURING LAPPING OF MAGNETIC HEADS

FIELD OF THE INVENTION

This invention relates to a method and apparatus for controlling the manufacture of magnetic transducers and in particular to a lapping system used during batch fabrication of magnetic heads.

DESCRIPTION OF THE PRIOR ART

Magnetic heads are used extensively in data processing systems, such as disk drives. During the manufacture of magnetic heads, particularly thin film transducers, the pole tips at which the transducing gap is disposed are ground and lapped to achieve a desired throat height at which optimum data signal processing can be realized. The throat height of all the transducers made during a production run for use with a data storage product must be maintained within a defined limited tolerance.

During head production, batch fabrication is employed whereby a multiplicity of transducers are deposited in a row on a ceramic bar for lapping, polishing and processing simultaneously. The ceramic bar serves as a support or substrate for the transducers and subsequently is divided into head slider elements.

A problem that exists during the lapping process is row bow, which is a condition wherein the transducer pole tips that encompass the transducing gap are differently aligned relative to the lapping plate and therefore are lapped at different rates. Apparently this condition would result in different throat heights for the transducers disposed in a row along the ceramic bar. Therefore, it has been a conventional practice to use a lapping control system incorporating optical lapping guides for visual control by an operator of the lapping process or electrical lapping guides formed with the magnetic head structure in order to measure the resistance of the heads during the lapping operation. The measured resistance provides an indication of the distance that has been lapped for an associated transducer which is representative of the throat height that has been reached by the lapping process. The optical guides depend upon the skill of the operator and both types of lapping guides add to the time and expense of the lapping operation.

SUMMARY OF THE INVENTION

An object of this invention is to provide a measuring circuit useful for a lapping control system that affords a rapid and accurate measurement of the magnetization characteristics of magnetic heads.

Another object of this invention is to provide a circuit for measuring throat height of an inductive magnetic head that precludes the need for optical or electrical lapping guides and is relatively low in cost to implement.

When used in the description herein, M is defined as the magnetization per unit of volume of a magnetic head; H is the magnetic field associated with the magnetic head; and B is the flux density existing at the magnetic field of the head. For low field intensities, the flux density B increases in direct proportion to H, and for large field intensities the head becomes saturated with flux so that a large increase of H causes only a slight increase of B.

According to this invention, an M-H looper circuit senses the saturation of the magnetic poles of an inductive thin film transducer to detect throat height. During operation of the M-H looper circuit, the M-H characteristic of a recording head is obtained by measuring changes in head inductance as a function of the drive or bias current provided to the windings of the head coil. The micro M-H looper is used for controlling throat height by measuring head saturation current, and sensing domain instability by measuring inductance instability while the head is being cycled through the M-H loop. In addition, the shape of the M-H loop is an indicator of problems related to wafer processing and therefore can be used for screening the heads in production prior to assembly. The M-H looper of this invention has as an objective the attainment of a proper M-H curve and throat height.

BRIEF DESCRIPTION OF THE DRAWINGS

The invention will be described in greater detail with reference to the drawings in which.

DETAILED DESCRIPTION OF THE PREFERRED EMBODIMENT

Figure 1:
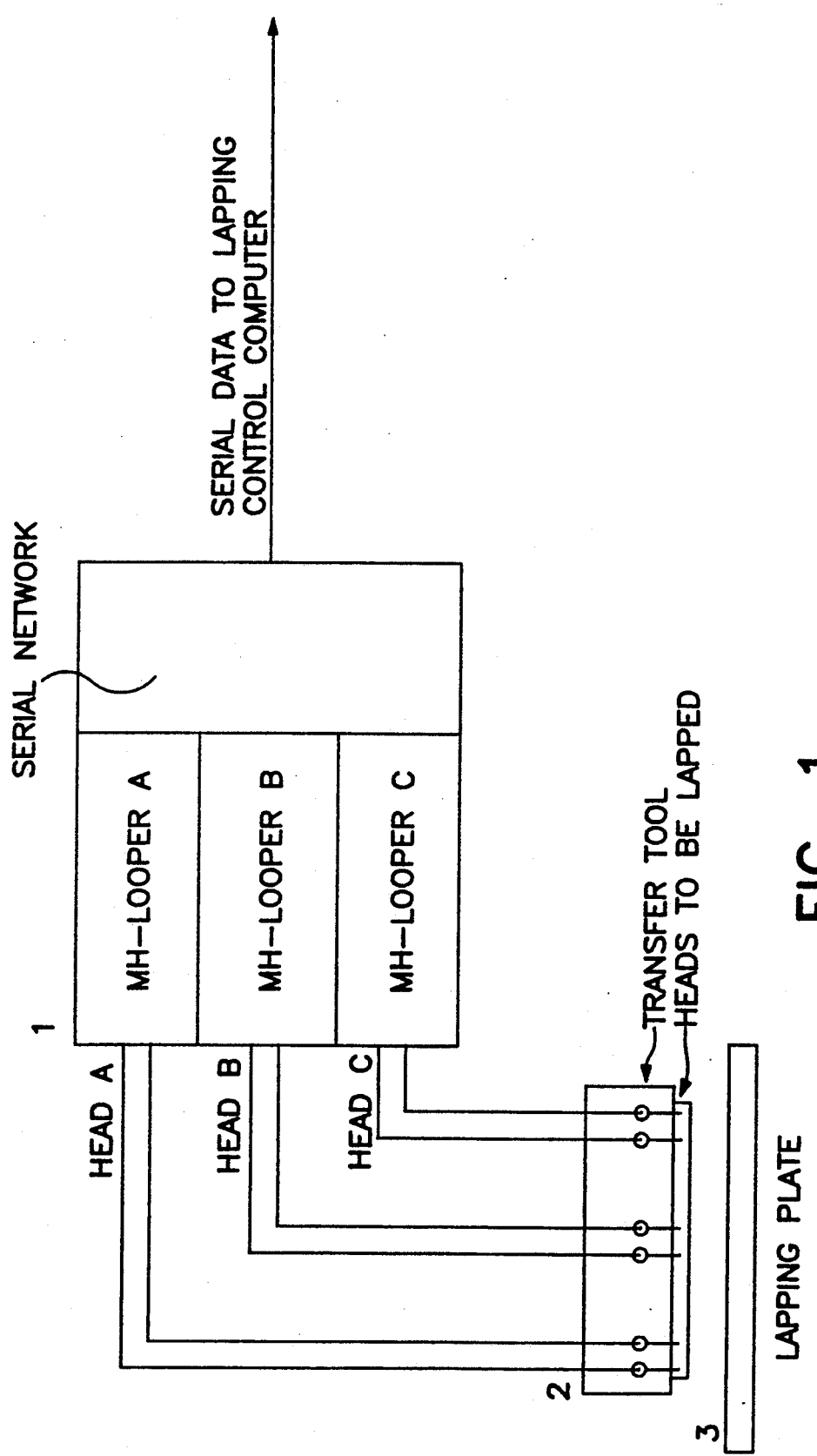
FIG. 1 is a representation of the lapping system, as implemented with this invention.

With reference to FIG. 1, the throat height system of this invention comprises three M-H loopers A,B,C, that are connected together through a network to a lapping control computer. Three of the heads on a transfer tool 2, which will be lapped on the lapping plate 3, are connected to the throat height control system via probes that are in contact with bonding pads on the transfer tool 2. The function of the throat height control system is to produce the status of throat height defined by saturation current of each head being tested to the lapping control computer for a closed loop autolapping system.

Figure 2:
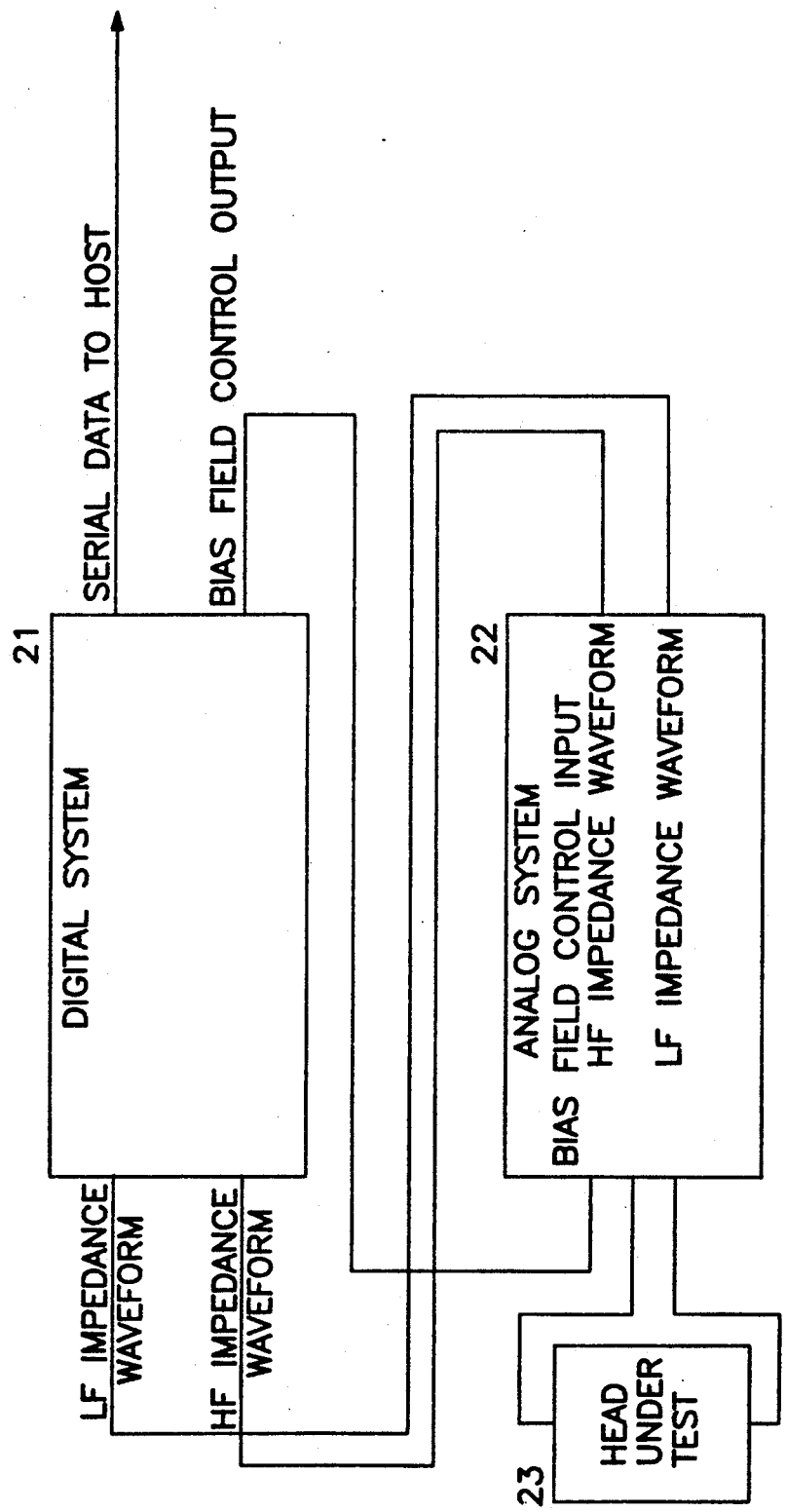
FIG. 2 is a block circuit diagram of the novel M-H looper system employed with this invention.

FIG. 2 illustrates an example of the M-H looper used with the throat height control system disclosed therein. The head under test 23 is connected to an analog system 22, which is under the control of a digital system 21. The analog system 22 generates a low frequency impedance waveform and a high frequency impedance waveform from the head under test 23 while the head under test 23 is cycled around its associated M-H loop. The digital system 21 generates a bias field control input to the analog system 22, processes the impedance waveforms to determine head saturation current and reconstructs the M-H loop characteristic of the head from the impedance waveforms.

Figure 3:
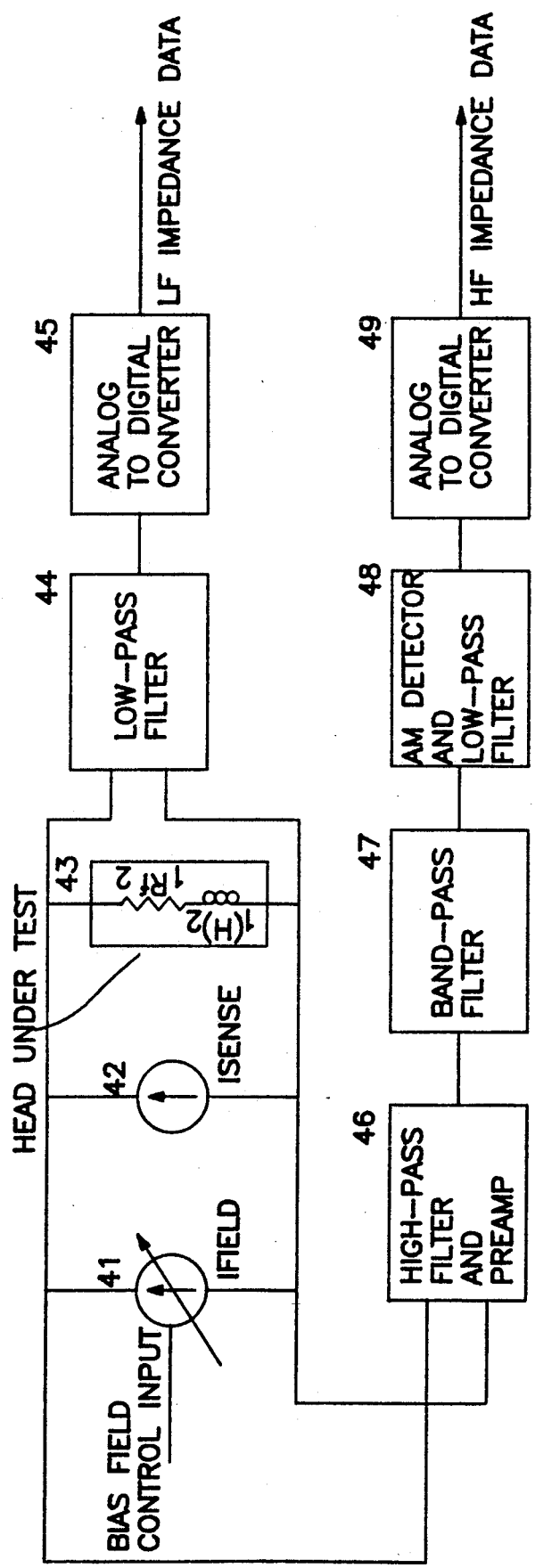
FIG. 3 is a schematic circuit block diagram of the analog system used with the M-H looper of FIG. 2.

With reference to the analog system depicted in FIG. 3, the head under test 43 is driven by a low frequency current source 41 and a high frequency current source 42. The low frequency current source 41, under control of the bias field control input signal, causes the head 43 to cycle around its M-H loop. The high frequency current source 42 is a small sensing current used to monitor the impedance of the head 43 as it is being cycled around its M-H loop by current source 41. The low frequency impedance data, which is used for determining head resistance, is generated by suppressing the high frequency voltage resulting from current source 42 with the low pass filter 44. The voltage provided by current source 41, which passes through low pass filter 44, is then converted to digital data with analog-to-digital converter 45 for further processing by the digital system. The high frequency impedance data is generated by first suppressing the low frequency voltage provided from current source 41 using the high pass filter 46. The bandpass filter 47 provides additional attenuation of the low frequency signal, and reduces noise by limiting the bandwidth. The envelope of the signal at the output of the bandpass filter 47 represents the high frequency impedance of head 43 as a function of the bias field current source 41. This envelope is detected by the AM detector and low pass filter 48 and converted to digital data by analog-to-digital converter 49.

Figure 4:
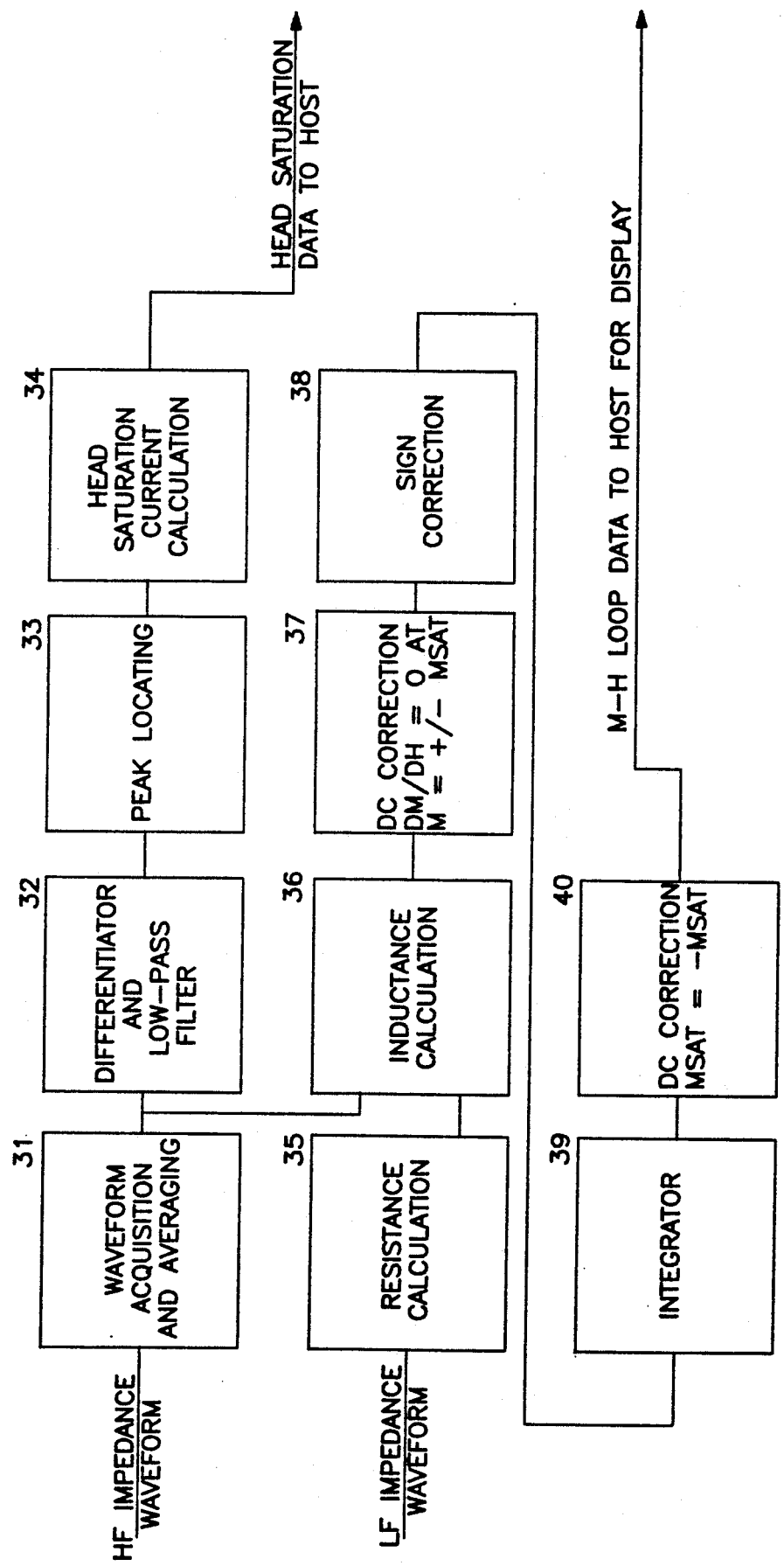
FIG. 4 is a block diagram of the digital portion of the M-H looper for providing a signal to control the lapping process.

With reference to FIG. 4, the digital system used for processing the data signal comprises a microcontroller with memory, digital I/0 ports, a serial port, and a digital-to-analog converter. Communication between the microcontroller and the host computer is accomplished through the serial port. The digital-to-analog converter, under control of the microcontroller, generates the bias field control input for the analog system.

FIG. 4 is a block diagram illustrating the operation and specific processing tasks that are implemented by the microcontroller. The waveform acquisition and averaging circuit 31 acquires and stores in memory the high frequency impedance waveform with averaging to reduce noise. The high frequency waveform is then processed by the differentiator and low pass filter 32. The resulting waveform is a series of pulses at which partial or total saturation of the head magnetic structure has occurred. The differentiated waveform is then processed by a peak locator 33. Peak location is done by looking at each point in sequence for a value above a fixed noise threshold. Then the maximum value and peak location is initialized to the value and location of the point found above the noise threshold. The microcontroller continues to look at each point in sequence, while updating the maximum value and peak position for the values that are greater than the stored maximum value. This process ends when a value is found below the maximum value relative to a fixed noise threshold. By using this peak locating algorithm, the location of the first saturation peaks around zero bias field current is passed to a head saturation current calculation circuit 34, where the average peak-to-peak head saturation current is calculated and reported to the host. Because the gap throat region is the first part of the head to be driven into saturation, the calculated saturation current will be a function of the throat height.

In order to construct the M-H loop, the resistance of the head is calculated using Ohm's law and the low frequency impedance by the resistance calculation circuit 35. Once the resistance of the head is known, the inductance value as a function of bias field current is generated from the high frequency impedance waveform by an inductance calculation circuit 36. By using the fact that the slope of the M-H loop at saturation is zero (dM/dH=0 at ±Msat), the DC correction circuit 37 subtracts a constant from the inductance waveform to bring the average inductance to zero at maximum bias field current magnitude. The sign correction circuit 38 changes the sign of the inductance value during the negative going portion of the bias field current sweep. The integrator circuit 39 then integrates the inductance waveform. The resulting magnetization waveform is further processed by a DC correction block 40 that adds a constant to the magnetization waveform to force equality of the magnetization magnitude at maximum bias field current magnitude, i.e., ($M_{sat} = -M_{sat}$). In this way, the M-H loop reconstruction process is completed and the resultant waveform can be sent to the host for further use and display.

The digital signal representative of the magnetization of the magnetic head is compared in the microprocessor which contains stored data of digital numbers representing throat height dimensions which were empirically derived by previous operation of magnetic heads of similar design and by observing the performance of such heads at different throat heights. The dimensions of throat heights of those heads which operated at optimum saturation for a given design was stored in the microcomputer for the purpose of comparison with the throat heights of heads being processed during subsequent lapping operations. When the optimum throat height of a head is obtained, the comparator provides a difference output signal, which may be zero, that indicates that the throat height of the head being checked by the M-H looper has reached the desired throat height. At this point, the lapping operation is halted preferably automatically under control of the microprocessor. An operator may view the magnetization curve, for the head being lapped, on a display.

By virtue of the micro M-H looper circuit disclosed herein, the alignment problem typically encountered with prior art lapping guides is eliminated. Also, a significant savings in cost is realized by having the ability to test magnetic heads prior to further processing and assembly after the lapping operation.

What is claimed is:

1. A circuit for measuring saturation current of a magnetic head disposed on a ceramic bar in order to control throat height during a lapping process comprising:

means for providing drive current to said head;
   a sensing circuit coupled to said head for measuring the inductance of said head;
   an M-H looper circuit coupled to said head for providing a measurement of saturation current of said head to indicate throat height status of said head; and
   a lapping control computer coupled to said M-H looper for controlling the lapping of said head in response to said current measurement;
   wherein said M-H looper circuit comprises an analog circuit coupled to said head for producing high frequency impedance and low frequency impedance waveform signals respectively; and a digital circuit coupled to said analog circuit for providing a bias field control signal to said analog circuit, said digital circuit including means for processing said high frequency impedance signals and separate means for processing said low frequency impedance signals, including means for directing said impedance signals from said analog circuit to provide a data signal representing said saturation current measurement to said computer.

2. A circuit as in claim 1, wherein said analog circuit comprises:

filter means coupled to the output circuit of said head for eliminating DC and low frequency components of the output signal from said head;

an AM detector coupled to said filter means for detecting the amplitude modulated signal output;

analog-to-digital converter means coupled to said filter means and said AM detector for providing low frequency and high frequency impedance data respectively representative of head saturation current.

3. A circuit as in claim 1, wherein said digital circuit comprises a high impedance waveform signal network including:

waveform signal averaging means;

a differentiator and low pass filter circuit coupled to said averaging means;

means coupled to said differentiator and filter circuit for locating the peaks of said high frequency impedance waveform signal being processed; and means coupled to said peak locator means for calculating head saturation current and for providing a data signal representative head saturation current to said computer.

4. A circuit as in claim 1, wherein said digital circuit comprises a low frequency impedance waveform signal network including:

means for calculating the resistance and inductance of said head, sign correction and DC correction means coupled to said resistance and inductance calculating means;

means for integrating the corrected signal; and means coupled to said integrating means for supplying a digital data signal representative of head current saturation.

5. A circuit as in claim 4, including means for comparing said digital signal to a stored signal representative of a desired throat height and for providing a difference signal for controlling the lapping of said head.

6. A circuit as in claim 1, including display means for receiving said data signal to provide a visual indication of the M-H loop associated with the head being lapped.

* * * * *